US007843823B2

(12) United States Patent
Lev-Ran et al.

(10) Patent No.: US 7,843,823 B2
(45) Date of Patent: Nov. 30, 2010

(54) TECHNIQUES FOR BALANCING THROUGHPUT AND COMPRESSION IN A NETWORK COMMUNICATION SYSTEM

(75) Inventors: Etai Lev-Ran, Sunnyvale, CA (US); Maxim S. Martynov, Los Gatos, CA (US); Daniel Kaminsky, Sunnyvale, CA (US); Hamid R. Amirazizi, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 906 days.

(21) Appl. No.: 11/495,072

(22) Filed: Jul. 28, 2006

(65) Prior Publication Data

US 2008/0025298 A1    Jan. 31, 2008

(51) Int. Cl.
*H04L 1/00* (2006.01)
(52) U.S. Cl. .................................. 370/230.1; 709/236
(58) Field of Classification Search ............... 370/230.1; 709/236
See application file for complete search history.

(56) References Cited

U.S. PATENT DOCUMENTS

| | | | |
|---|---|---|---|
| 2001/0054131 A1* | 12/2001 | Alvarez et al. ............... 711/105 |
| 2003/0043852 A1* | 3/2003 | Tadayon et al. ............. 370/477 |
| 2004/0015724 A1* | 1/2004 | Pham et al. .................. 713/201 |
| 2004/0056783 A1* | 3/2004 | Fallon .......................... 341/51 |
| 2004/0210668 A1* | 10/2004 | Garakani et al. ............ 709/236 |
| 2005/0222775 A1* | 10/2005 | Kisra et al. ................... 702/14 |
| 2005/0226518 A1* | 10/2005 | Suzuki et al. ................ 382/246 |

OTHER PUBLICATIONS

S. Schleimer, et al., "Winnowing: Local Algorithms for Document Fingerprinting", SIGMOND 2003, Jun. 9-12, 2003, San Diego, CA, copyright 2003 ACM 1-58113-634-X/03/06, 10 pgs.
A. Muthitacharoen, et al., "A Low-Bandwidth Network File System", published Oct. 2001, 14 pgs.

* cited by examiner

*Primary Examiner*—Kwang B Yao
*Assistant Examiner*—Juvnea Loo
(74) *Attorney, Agent, or Firm*—Hickman Palermo Truong & Becker LLP

(57) ABSTRACT

A method and apparatus is disclosed for balancing throughput and compression in a network communication system. A message is received. A first compression mechanism is applied to the message to generate a first compressed message, where applying the first compression mechanism comprises gathering compression information. Based on the compression information, a compression metric associated with the first compressed message is computed. The compression metric is compared to a threshold value. A second compression mechanism is applied to the first compressed message to generate a second compressed message only when the compression metric does not exceed the threshold value. The second compressed message is then transmitted.

39 Claims, 5 Drawing Sheets

TECHNIQUES FOR BALANCING THROUGHPUT AND COMPRESSION IN A NETWORK COMMUNICATION SYSTEM

FIELD OF THE INVENTION

The present invention generally relates to network communications. The invention relates more specifically to compression in a network communication system.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In general, compression refers to a process of encoding data with fewer bytes or bits than an un-encoded representation of the data would include. In network communications, data compression is typically performed through use of compression mechanisms, which take the data to be encoded as input and produce an encoded, or compressed, representation of the data as output. Typically, data transmitted in a network is compressed in order to reduce the network bandwidth that is consumed during the transmission of the data, which in turn increases the network throughput.

In order to achieve better network throughput, some network communication systems may use two or more compression mechanisms in succession to compress data that is to be transmitted over a network. For example, in one network compression system, data in a message is compressed by two compression mechanisms that are run one after the other before the message is transmitted to a receiver over the network. The first compression mechanism is a data redundancy elimination mechanism that uses a chunking algorithm to break the message into one or more data chunks. The data redundancy elimination mechanism then tries to match the one or more data chunks in the message to data chunks that have previously been sent to the same receiver. Each data chunk in the message that has previously been transmitted to the receiver is replaced in the message by a chunk identifier, where the chunk identifier is a short value on the basis of which the receiver is capable of determining the data in the data chunk upon receipt of the message. Data chunks in the message that are not matched to previously transmitted data chunks are left in the message with their original data. The resulting compressed message is then further compressed by a standard compression mechanism, such as a Lempel-Ziv (LZ) compression mechanism before being transmitted to the receiver.

One of the disadvantages of using multiple compression mechanisms to compress the same data is that applying multiple compression mechanisms on the data is computationally expensive with respect to the computer system on which the data compression mechanisms are executed. Further, applying multiple compression mechanisms to transmitted data at the sender computer system typically requires the receiver computer system to also apply multiple decompression mechanisms to the transmitted data, which is similarly computationally expensive. In order to compress and decompress the data, the data compression and decompression mechanisms use various computer system resources, such as, for example, CPU cycles, memory, and storage space. Typically, in order to achieve higher compression, the data compression mechanisms need to use more of these computing resources, and the data decompression mechanisms similarly need to use more computing resources to decompress highly compressed data. High usage of computing resources, however, impedes the performance of the computer systems performing the compression and decompression and may cause a significant latency in the response times from the perspective of a user that uses the computer systems to transmit the data over a network. Thus, while usage of multiple compression mechanisms may increase the compression of transmitted data and may improve network throughput, it may also impede computer system performance and may increase the latency of user response times because of a significant usage of computing resources.

For example, the LZ compression mechanism used in above-described network compression system is based on an algorithm that exploits the redundancy of the bytes in a message that is transmitted to the receiver. Since the LZ compression mechanism is byte-oriented, the computational effectiveness of the LZ compression mechanism with respect to usage of computing resources is dependant on the number of bytes received as an input. For example, the LZ compression mechanism would consume substantially the same amount of computing resources for some pairs of different messages that have the same number of bytes, where one of the messages in a given pair includes a significant amount of redundant bytes while the other message does not. However, while applying the LZ compression mechanism on the former message would be beneficial in that it would produce a better compression for the message (and hence improve network throughput), applying the LZ compression mechanism on the latter message would result in wasted computing resources since the latter message does not include a lot of redundant bytes and thus cannot be significantly compressed.

Although the disadvantage of using multiple compression mechanisms to compress data is presented above with respect to a network communication system, it is noted that this disadvantage is not unique to the area of network communications. Rather, this disadvantage is common to any systems that employ multiple compression mechanisms to compress and process data, such as, for example, archiving systems and backup systems.

Based on the foregoing, there is a clear need for techniques for balancing throughput and compression in systems that use multiple compression mechanisms.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
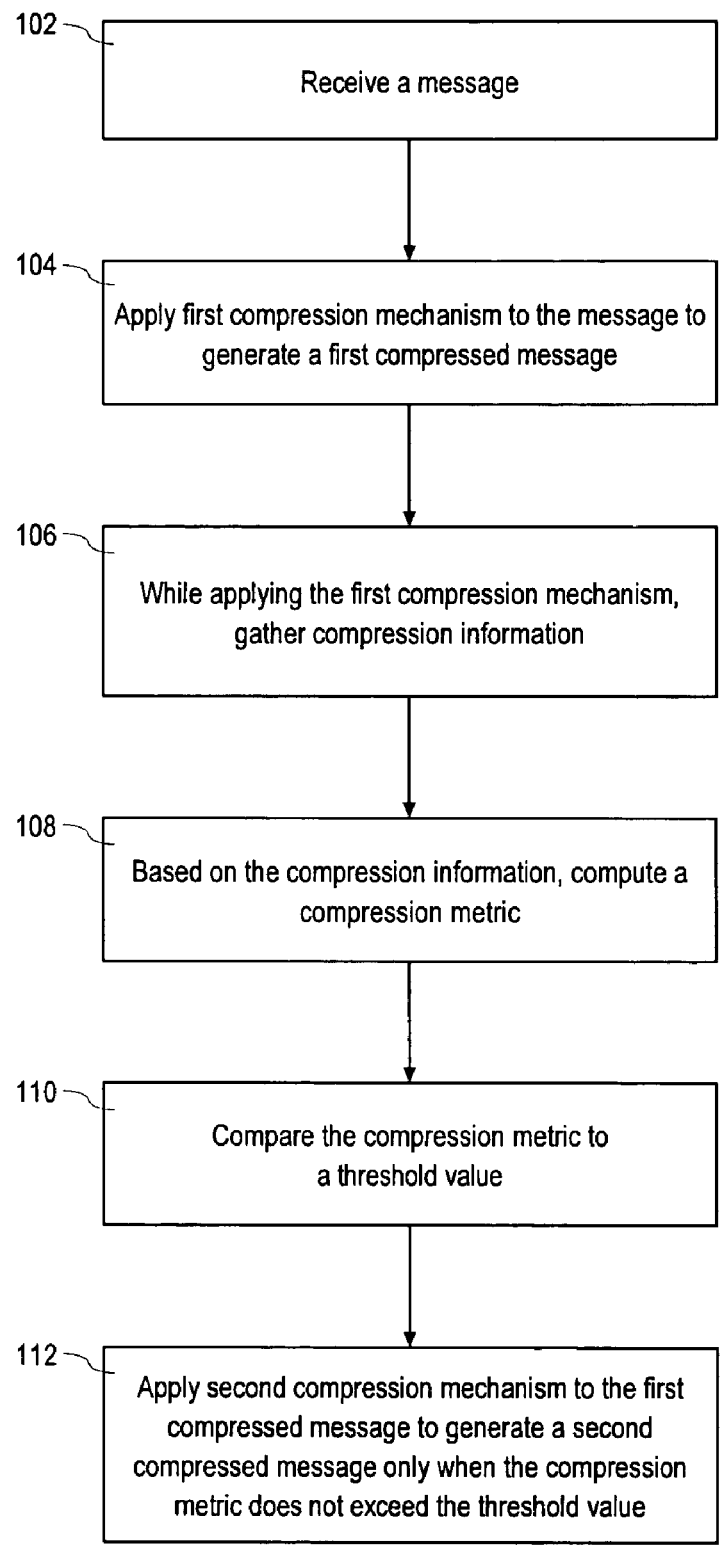
FIG. 1 is a flow diagram that illustrates a high level overview of one embodiment of a method for balancing throughput and compression in systems that use multiple compression mechanisms to compress data.

Balancing throughput and compression in a network communication system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Functional Overview |
| 3.0 | Operational Context of One Embodiment |
| 4.0 | Methods of Balancing Throughput and Compression |
| | 4.1 Using Heuristics-Based Compression Metrics |
| | 4.2 Using Entropy-Based Compression Metrics |
| | 4.3 Using Multiple Compression Metrics |
| | 4.4 Additional Features and Alternative Embodiments |
| 5.0 | Implementation Mechanisms- Hardware Overview |
| 6.0 | Extensions and Alternatives |

1.0 General Overview

The needs identified in the foregoing Background, and other needs and objects that will become apparent for the following description, are achieved in the present invention, which comprises, in one aspect, an apparatus comprising one or more processors and a computer-readable storage medium comprising one or more stored instructions which, when executed by the one or more processors, cause: receiving a message; applying first compression mechanism to the message to generate a first compressed message, where applying the first compression mechanism comprises gathering compression information; based on the compression information, computing a compression metric that is associated with the first compressed message; comparing the compression metric to a threshold value; and applying second compression mechanism to the first compressed message to generate a second compressed message only when the compression metric does not exceed the threshold value.

In one feature of this aspect, the second compressed message is transmitted in a protocol data unit to a receiver over a network, where the protocol data unit comprises a payload that stores the second compressed message and a header that stores data that indicates that the second compressed message is generated by applying the second compression mechanism.

In another feature of this aspect, the message is a portion of a file, such as, for example, a disk block, where the file is to be compressed and stored as a compressed file in a file system. In this feature, the second compressed message is stored as part of the compressed file.

In one feature of this aspect, the one or more stored instructions further comprise instructions which, when executed by the one or more processors, cause: receiving a plurality of successive messages that include the message, where the plurality of successive messages represent data in a data stream; applying the first compression mechanism to the plurality of successive messages, where applying the first compression mechanism comprises gathering specific compression information for each specific message of the plurality of successive messages; based on each specific compression information, computing a specific compression metric that is associated with each specific message of the plurality of successive messages; comparing each specific compression metric to the threshold value; and selectively differently applying the second compression mechanism for at least two different messages of the plurality of successive messages by applying the second compression mechanism to one message of the at least two different messages and not applying the second compression mechanism to another message of the at least two different messages.

In one feature of this aspect, the first compression mechanism is a data redundancy elimination mechanism that breaks the message into one or more data chunks and replaces, in the first compressed message, at least one data chunk of the one or more data chunks with a reference associated with that data chunk, such as, for example, a digital signature that is computed for that data chunk. In this feature, the second compression mechanism is a Lempel-Ziv (LZ) compression mechanism.

In one feature of this aspect, the compression information includes the size of the message and the size of the first compressed message. The compression metric is a compression ratio of the first compressed message that is computed based on the size of the message and the size of the first compressed message.

In one feature of this aspect, the compression information includes frequencies with which a plurality of different bytes occur in the message. The compression metric is an entropy value that is computed based on the frequencies, where the entropy value indicates a measure of randomness of the data included in the first compressed message.

Another aspect comprises an apparatus, which comprises a network interface that is coupled to a network for sending and receiving one or more packet flows, one or more processors, and a computer-readable storage medium comprising one or more stored instructions which, when executed by the one or more processors, cause: receiving a message that is to be transmitted to a receiver over the network; applying first compression mechanism to the message to generate a first compressed message, where applying the first compression mechanism comprises: identifying one or more data chunks in the message, computing a signature for each of the one or more data chunks, generating the first compressed message, where, for each of the one or more data chunks, the first compressed message includes one of that data chunk and the signature associated with that data chunk, and gathering compression information associated with at least one of the message and the first compressed message; based on the compression information, computing a compression metric that is associated with the first compressed message; comparing the compression metric to a threshold value in order to decide whether to apply second compression mechanism to the first compressed message; applying the second compression mechanism to the first compressed message to generate a second compressed message only when the compression metric does not exceed the threshold value; and transmitting one of the first compressed message and the second compressed message to the receiver. In one feature of this aspect, the second compression mechanism is an LZ compression mechanism.

In one feature of this aspect, the compression information includes the number of the one or more data chunks identified in the message and the number of signatures included in the first compressed message. The compression metric is a compression ratio of the first compressed message that is computed based on the number of the one or more data chunks identified in the message and the number of signatures included in the first compressed message.

In one feature of this aspect, the step of identifying the one or more data chunks in the message further comprises identifying a set of boundaries that delimit the one or more data chunks. In this feature, the step of gathering the compression information further comprises, at each boundary of the set of boundaries, taking a sample of one or more bytes that are stored on at least one side of that boundary. The step of computing the compression metric further comprises: based on the collected samples of bytes, computing estimated frequencies with which a plurality of different bytes occur in the first compressed message; and, based on the estimated frequencies, computing the compression metric as an entropy value, where the entropy value indicates a measure of randomness of the data included in the first compressed message.

In one feature of this aspect, two compression metrics are used to determine whether to apply the second compression mechanism. In this feature, the step of gathering the compression information further comprises: taking a sample of bytes from each data chunk in the message that would be included in the first compressed message and that would not be replaced by a corresponding signature in the first compressed message; and determining the size of the message and the size of the first compressed message. The step of computing the compression metric further comprises: computing a first compression metric as a compression ratio of the first compressed message based on the size of the message and the size of the first compressed message; based on the collected samples of bytes, computing estimated frequencies with which a plurality of different bytes occur in the first compressed message; and, based on the estimated frequencies, computing a second compression metric as an entropy value, where the entropy value indicates a measure of randomness of the data included in the first compressed message. The step of comparing the compression metric to the threshold value further comprises: comparing the first compression metric to the first threshold value; and comparing the second compression metric to the second threshold value. In this feature, the step of applying the second compression mechanism further comprises applying the second compression mechanism only when the first compression metric does not exceed the first threshold value and the second compression metric does not exceed the second threshold value.

In one feature of this aspect, the one or more stored instructions further comprise instructions which, when executed by the one or more processors, cause: for each of a plurality of successive messages that include the message, performing the steps of receiving the message, applying the first compression mechanism, computing the compression metric, comparing the compression metric to the threshold value, applying the second compression mechanism, and transmitting; and for at least two different messages of the plurality of successive messages, making different decisions of whether to apply the second compression mechanism. In a related feature, the one or more stored instructions further comprise instructions which, when executed by the one or more processors, cause: determining whether a decision not to apply the second compression mechanism to a particular message of the plurality of successive messages is correct; and modifying the threshold value when the decision is not correct. This feature may further provide for periodically performing the steps of determining whether a decision not to apply the second compression mechanism to a particular message is correct and modifying the threshold value when the decision is not correct.

In one feature of this aspect, the step of applying the first compression mechanism to the message further comprises maintaining a data transmission dictionary, where the data transmission dictionary includes signatures of previously transmitted data chunks. In this feature, the step of generating the first compressed message further comprises: if a particular signature computed for a particular data chunk of the one or more data chunks is not located in the data transmission dictionary, then including the particular data chunk in the first compressed message; and if a particular signature computed for a particular data chunk of the one or more data chunks is located in the data transmission dictionary, then including, in the first compressed message, the particular signature but not the particular data chunk.

In other aspects, the invention encompasses a method, a computer apparatus, and a computer-readable medium configured to carry out the foregoing steps.

Embodiments of the described techniques for balancing throughput and compression in network communication systems may be implemented using one or more computer programs executing on a network element that is established in a packet-switched network. Thus, in one embodiment the techniques described herein are implemented on a router. In other embodiments, the techniques described herein may be implemented on switches and on network devices that are configured to provide content-based management of network traffic.

2.0 Functional Overview

FIG. 1 is a flow diagram that illustrates a high level overview of one embodiment of a method for balancing throughput and compression in systems that use multiple compression mechanisms to compress data.

A message is received in step 102. As used herein, "message" refers to a unit of data. Depending on the operational context in which the techniques described herein are implemented, in some embodiments the message may be a data unit that is exchanged between applications, such as, for example, an application-level protocol message. In other embodiments, the message may be a portion of a file that is to be compressed, such as, for example, a file data block. In yet other embodiments, the message may be a protocol data unit that is exchanged between endpoints in a network, such as, for example, a Transmission Control Protocol (TCP) segment. In yet other embodiments, the message may be a portion of a data stream that is processed by different components in the same computer system. In these embodiments, a compression metric may be associated, and carried, with the message between the different components. Thus, the techniques described herein are not limited to being performed with respect to any particular type of data unit, and for this reason the examples of messages provided herein are to be regarded in an illustrative rather than a restrictive sense.

In step 104, a first compression mechanism is applied to the message to generate a first compressed message. As used herein, "compression mechanism" refers to a set of instructions which, when executed, process an input message and produce a compressed output message according to a particular compression algorithm. In some embodiments, a compression mechanism may be implemented as one or more software modules that are executed by one or more processors. In other embodiments, a compression mechanism may be implemented as an application-specific integrated circuit (ASIC) that is configured to process input message by executing ASIC microcode instructions. Thus, the techniques described herein are not limited to being implemented with respect to any particular type of compression mechanism, and for this reason the examples of compression mechanisms provided herein are to be regarded in an illustrative rather than a restrictive sense.

In step 106, while the first compression mechanism is being applied to a received message, compression information is collected. In step 108, a compression metric associated with the first compressed message is computed based on the compression information. As used herein, "compression information" refers to data associated with one or more data compression characteristics, and "compression metric" refers to a value that quantitatively expresses one or more compression characteristics of a compressed message. For example, in one embodiment the collected compression information may be heuristic-based data that is used to compute a compression metric in the form of a compression ratio for the message being processed. In another embodiment, the collected compression information may be samples of bytes, which samples may be used to compute estimated occurrence frequencies for the different bytes in a message being compressed. In this embodiment, the estimated occurrence frequencies for the different bytes in the message may be used to compute an entropy value for the compressed message. (An entropy value indicates a measure of randomness of the data included in a message.) Further, in some embodiments compression information may be collected from multiple messages and may be compounded for an aggregation of messages, such as, for example a set of messages from a user session and/or from protocol used by multiple users. In these embodiments, the compression information collected in one message and the compression metric computed therefrom may be compounded with compression information and metrics of other messages in order to provide additional behavioral controls. Thus, the techniques described herein are not limited to any particular type of compression information or compression metric, and for this reason the examples of compression information and compression metrics provided herein are illustrative rather than restrictive.

In step 110, the compression metric computed for the first compressed message is compared to a threshold value. According to the techniques described herein, a threshold value indicates an acceptable measure of one or more compression characteristics associated with a compressed message. For example, in some embodiments the threshold value, which is compared to a compression metric associated with a compressed message, may be selected to indicate whether any further compression of the compressed message would be meaningful and would produce beneficial results. In addition, depending on the particular operational context and the particular compression mechanisms being used, in different embodiments a wide variety of threshold values may be used to specify whether further compression would be beneficial. In different embodiments, the threshold value may be defined by a user or may be a value that is associated with an automatic or user-configurable parameter of the computer system implementing the techniques described herein.

In step 112, a second compression mechanism is applied to the first compressed message to generate a second compressed message only when the compression metric associated with the first compressed message does not exceed the threshold value; thereafter, the second compressed message may be further processed according to the context of the particular embodiment. A compression metric that exceeds the threshold value indicates that any further compression on the first compressed message would not be beneficial; thus, according to the techniques described herein, when the compression metric exceeds the threshold value the second compression mechanism is not applied to the first compressed message. In this way, the techniques described herein provide for balancing throughput and compression in systems that use multiple compression mechanisms.

In some embodiments, when the compression metric exceeds the threshold value, the second compression mechanism may be still be applied to an already compressed message but with configuration parameters that are modified to produce beneficial compression. For example, configuration parameters of the second compression mechanism may be changed in such a way as to guarantee that resource efficient and/or beneficial compression may be achieved when the second compression mechanism is applied on an already compressed message. In these embodiments the threshold value may depend on the available bandwidth as configured or measured at run-time by the computer system executing the compression mechanisms. For example, what would be considered beneficial compression resulting in increased throughput for compressed data transmitted over a 56 Kbps modem link would be different from what would be considered beneficial compression for data transmitted on a high bandwidth link. Thus, in these embodiments the threshold value may be dynamically reconfigured to take into account the type of the communication link. Further, in different embodiments and/or operational contexts beneficial compression may be defined in a number of different ways. For example, in some embodiments it may be considered that beneficial compression would be achieved if the transfer time of the original message would be greater than the sum of the compression time, the decompression time, and the transfer time for the compressed message. Thus, since the transfer time depends on available communication link bandwidth, in these embodiments what would be considered beneficial compression (and the threshold value dynamically configured correspondingly thereto) may further depend on the currently available network bandwidth.

Even though the method illustrated in FIG. 1 is described with respect to processing a single message, the techniques described herein are not so limited. Rather, the techniques described herein may be applied on an arbitrary number of successive messages, where for each message separate compression information is gathered, a separate compression metric is computed and compared to the threshold value, and a separate decision is made of whether to apply to second compression mechanism. Thus, the techniques described herein are completely adaptive since for different successive messages different decisions may be made of whether or not to apply the second compression mechanism. In this way, the techniques described herein provide for a very efficient way to balance throughput (which is advanced by achieving higher rates of compression) with compression (for which higher rates are achieved by consuming more computer resources).

In addition, even though the method illustrated in FIG. 1 is described with respect to a system that uses two compression mechanisms, the techniques described herein are not so limited. Rather, the techniques described herein may be used in systems that use more than two compression mechanisms to compress data, where a decision of whether to apply any subsequent compression mechanism may be based on comparing a particular threshold value to a compression metric that is computed based on compression information gathered while applying the previous compression mechanism to a message that is to be compressed. Further, in some embodiments the techniques described herein may be further extended by providing mechanisms and logic for selecting any subsequent compression mechanism based at least on the compression information collected from a previous compression mechanism. For example, the collected compression information may be used to select a particular variant of a particular compression mechanism, such as, for example, LZW, LZO, and/or Wkdm. For this reason, the embodiment of the method for balancing throughput and compression depicted in FIG. 1 is to be regarded in an illustrative rather than a restrictive sense.

3.0 Operational Context of the One Embodiment

Figure 2:
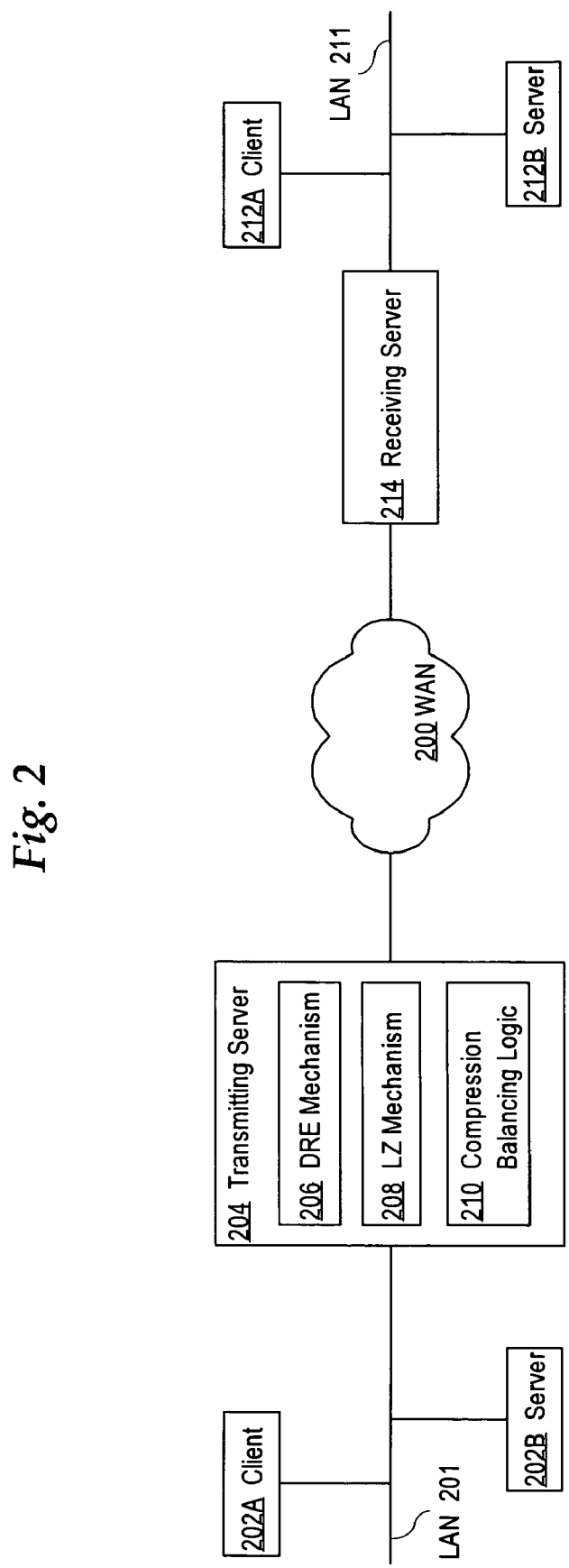
FIG. 2 is a block diagram that illustrates an overview of one operational context in which an embodiment may be implemented.

FIG. 2 is a block diagram that illustrates on overview of one operational context in which an embodiment may be implemented. This operational context may represent portions of the network infrastructure of a geographically dispersed enterprise, in which Local Area Network (LAN) 211 is established at the main office of the enterprise, and LAN 201 is established at a branch office of the enterprise. The branch office LAN 201 is communicatively connected to the main office LAN 211 over WAN 200. The techniques described herein, however, may be implemented in various other operational contexts, such as, for example, an operational context in which point-to-point network traffic is exchanged over any type of one or more communication links, and an operational context in which the messages being compressed are portions of a file or files that are being backed up or archived. For this reason, the operational context depicted in FIG. 2 is to be regarded in an illustrative rather than a restrictive sense.

In the operational context depicted in FIG. 2, receiving server 214 is established in LAN 211, and serves as a proxy for various services and data resources provided to remote clients by network entities established in LAN 211, such as, for example, client 212A and server 212B. Receiving server 214 is communicatively connected to transmitting server 204 over WAN 200. Transmitting server 204 is established in LAN 201, and is communicatively connected to one or more network entities, such as, for example, client 202A and server 202B. Transmitting server 204 serves as a proxy for the network entities established in LAN 201 that need to access services and data resources provided in LAN 211.

In FIG. 2, receiving server 214 and transmitting server 204 are designated as "receiving" and "transmitting" servers to in order to illustrate an embodiment in which the techniques described herein are implemented to provide balancing of throughput and compression with respect to network traffic that is transmitted from LAN 201 to LAN 211. However, each of receiving server 214 and transmitting server 204 may serve as a proxy for some or all of the network traffic exchanged in either direction between LAN 201 and LAN 211, and each of receiving server 214 and transmitting server 204 may perform the techniques described herein. In particular, receiving server 214 and transmitting server 204 may perform the functions of both senders (transmitters) and receivers of data, as described herein, depending on the direction of the network traffic. Thus, the "receiving" and "transmitting" designations of servers 214 and 204 are used for illustrative purposes only, and do not in anyway qualify or restrict the techniques described herein to network traffic that has a particular direction.

Embodiments of the techniques described herein may be implemented in the operational context depicted in FIG. 2 at transmitting server 204. In one embodiment, the techniques described herein are implemented by a transmitting server by using one or more computer programs, services, or clients that are running on a computer system. In some embodiments, the computer system may be a network element, such as, for example, a router or a switch. In other embodiments, the computer system on which a transmitting server implements the techniques described herein may be any type of computer hardware platform.

In the embodiment depicted in FIG. 2, transmitting server 204 comprises Data Redundancy Elimination (DRE) mechanism 206, LZ mechanism 208, and compression balancing logic 210. In this embodiment, DRE mechanism 206, LZ mechanism 208, and compression balancing logic 210 may be implemented at transmitting server 204 in a variety of ways including, but not limited to, as part of a proxy client or a proxy server, as a service or daemon, and as one or more software modules or library of functions that may be used for transmitting compressed data across WAN 200.

In this embodiment, DRE mechanism 206 is a compression mechanism that receives an input message and generates a compressed output message by first using a chunking algorithm to break the input message into data chunks, then using a cryptographic function to generate a unique identifier for each data chunk, and finally replacing in the compressed output message each data chunk that has previously been transmitted to the receiving server with its associated unique identifier. LZ mechanism 208 is a lossless compression mechanism that compresses an input message according to algorithms that are based on, or derived from, Lempel-Ziv algorithms. Examples of such algorithms include, but are not limited to LZ77, LZ78, Lempel-Ziv-Welch (LZW), and Lempel-Ziv-Renau (LZR). According to the techniques described herein, compression balancing logic 210 and/or DRE mechanism 206 gathers compression information that is associated with each compressed output message generated by DRE mechanism 206. Based on the compression information associated with a particular compressed message, compression balancing logic 210 computes a compression metric for that message and compares the compression metric to a predefined threshold value. If the compression metric does not exceed the threshold value, compression balancing logic 210 directs transmitting server 204 or a component thereof to send that message (which is compressed by DRE mechanism 206) to LZ mechanism 208 for further compression before transmitting the second compressed message to receiving server 214. If the compression metric exceeds the threshold value, then compression balancing logic 210 directs transmitting server 204 or a component thereof to transmit that message (as compressed only by DRE mechanism 206) to receiving server 214 without further compressing the message by LZ mechanism 208.

In operation, transmitting server 204 acts as a proxy and continuously receives a stream of data that is sent from network entities in LAN 201 to network entities in LAN 211. The stream of data processed by transmitting server 204 may be any type of continuous or message-based data stream including, but not limited to, a stream of application-specific messages, a stream of protocol data units, and a byte-stream carrying particular content. In processing the stream of data, transmitting server 204 splits up the stream of data into messages. The messages are then processed by DRE mechanism 206 and/or LZ mechanism 208 before being transmitted to receiving server 214.

DRE mechanism 206 uses a chunking algorithm to process an input message. The chunking algorithm identifies data chunks in messages based on the content of the messages. In the embodiment depicted in FIG. 2, the chunking algorithm may be based on the Rabin fingerprinting technique described in Michael O. Rabin, *Fingerprinting by Random Polynomials*, Technical Report TR-15-81, Center for Research in Computing Technology, Harvard University, 1981.

According to the chunking algorithm used in this embodiment, one or more chunk delimiters, or breakpoints, are located in an input message that is slated for transmission to receiving server 214. To locate the breakpoints, a distinctive "fingerprint" function F(x) is calculated over a small sliding window (of typically, 24-48 bytes in size) at each byte of the input message. For example, at the $k^{th}$ byte the sliding window would extend backward from the $k^{th}$ byte a <size-of-window> number of bytes. The fingerprint function F(x) is based on a 32-bit irreducible polynomial that produces 32-bit reminders. The fingerprint function F(x) calculates a fingerprint value that depends solely on the current window contents and exhibits good distribution and a low collision probability. (A collision is said to occur when different window contents produce the same fingerprint). Furthermore, the 32-bit polynomial function F(x) is computationally efficient and easy to compute in a rolling manner as the window slides from one byte to the next.

After calculating the fingerprint value at each byte, the fingerprint value is compared against a breakpoint selection criteria to locate the potential breakpoints. For example, if the fingerprint value F(k) calculated after adding the $k^{th}$ byte satisfies the expression $$F(k) \bmod (2^n - 1) = 0,$$

then the $k^{th}$ byte marks the end of a data chunk and is selected as a breakpoint. Any breakpoint that creates a data chunk smaller than some pre-configured value (e.g. 128 bytes) may be ignored and the fingerprinting may continue. Once the entire input message has been traversed and a fingerprint value has been calculated at each byte, the boundaries of the one or more data chunks in the input message are determined based on the selected breakpoints. Since the fingerprint values depend solely on the sliding window's contents, the selection of breakpoints results in a random selection of data chunks within the input message.

Once a data chunk of the input message has been identified, DRE mechanism 206 uses a collision-resistant cryptographic hash function to compute an identifier, such as, for example, a digital signature, for that data chunk. The functions used to compute a data chunk's signature may be any now known or later developed functions including, but not limited to, Message Digest 5 (MD5), Secure Hash Algorithm-1 (SHA-1), Hash127, and Panama Hash. In general, any function that produces a sufficiently large signature to satisfy the collision-resistance requirements of a particular embodiment may be used. Further, while the fingerprint values used to determine the boundaries of a data chunk depend only on the content of a short sliding window that precedes the breakpoints, the data chunk signature depends on the entire content of the data chunk. Typically, collision-resistant cryptographic functions produce a 128-160 bit signatures, and their collision rate is many orders of magnitude lower than the possibility of network transmission errors or disk errors going undetected.

Once the signatures for each data chunk of the input message are computed, DRE mechanism 206 checks each signature against a data transmission dictionary to determine whether the data chunk identified by this signature has previously been transmitted to receiving server 214. The data transmission dictionary maintained at transmitting server 204 is a cache that stores the signatures of data chunks that have previously been transmitted to, and acknowledged as received by, receiving server 214. (In the embodiment depicted in FIG. 2, transmitting server 204 and receiving server 214 maintain a synchronized data transmission dictionary; that is, receiving server 214 also maintains a data transmission dictionary as a cache which stores the same signatures that are maintained at transmitting server 204, as well as the actual data chunks that are associated with each signature.)

From the input message, DRE mechanism 206 generates a compressed output message in the following way: if a particular signature computed for a particular data chunk of the input message is not located in the data transmission dictionary, then DRE mechanism 206 includes the particular data chunk in the compressed message; and if a particular signature computed for a particular data chunk of the message is located in the data transmission dictionary, then DRE mechanism 206 includes, in the compressed message, the particular signature but not the particular data chunk. In this way, DRE mechanism 206 effectively replaces all previously transmitted data chunks of the input message with signatures that are shorter in length.

According to the techniques described herein, during the process of generating the compressed output message, DRE mechanism 206 and/or compression balancing logic 210 gather compression information associated with the compressed message. For example, the compression information may include the size of the input message and the size of the compressed message. In another example, the compression information may include the number of data chunks in the input message and the number of data chunks that have been replaced by signatures in the compressed message. In yet another example, the compression information may include the number of signature bytes and the number of the original bytes remaining in the compressed message. In yet another example, the compression information may include samples of bytes that are collected at the boundary of each data chunk that is not replaced by a signature in the compressed message. Based on the compression information, compression balancing logic 210 then computes a compression metric for the compressed message. For example, the compression metric may be computed as a compression ratio of the compressed message, where the compression ratio may be computed based on the sizes of the input message and the compressed message, and/or based on the number of data chunks in the input message and the number of data chunks that have been replaced by signatures in the compressed message. In another example, compression balancing logic 210 may use the samples of bytes collected at the boundary of each data chunk to compute estimated occurrence frequencies of different bytes in the compressed message. The estimated occurrence frequencies may then be used to compute the compression metric of the compressed message as an entropy value, which indicates a measure of randomness of the data included in the compressed message.

Compression balancing logic 210 then compares the compression metric to a threshold value. If the compression metric does not exceed the threshold value, then compression balancing logic 210 directs LZ mechanism 208 to further compress the compressed message. After LZ mechanism 208 generates a second compressed message, the second compressed message is transmitted to receiving server 214. For example, the second compressed message may be included in the payload of a protocol data unit (PDU) that is sent to receiving server 214 according to a transmission protocol that govern the transmitting and receiving of data by proxy servers. In addition, the PDU may also include a header indicating that the message in the payload has been compressed by the LZ mechanism 208. If the compression metric exceeds the threshold value, then compression balancing logic 210 direct transmitting server 204 to send the message compressed by DRE mechanism 206 to receiving server 214 without further compression. The compressed message may be sent to receiving server 214 in a PDU, the header of which would indicate that the message is not compressed by LZ mechanism 208. In the embodiment depicted in FIG. 2, the PDU storing the compressed message may be transmitted to receiving server 214 over a variety of other transport-level or session-level protocols, such as, for example, TCP and Common Internet File System (CIFS) protocol.

In this way, compression balancing logic 210 determines whether applying the LZ mechanism 208 to any particular compressed message is likely to produce any meaningful and beneficial compression. If applying LZ mechanism 208 to the particular compressed message would produce beneficial compression, then LZ mechanism 208 is run on the message. Otherwise, LZ mechanism 208 is skipped and is not run on the message, thus freeing computing resources at transmitting server 204 and improving the performance and user-perceived throughput. In some embodiments that allow dynamic configuration of LZ parameters, the compression balancing logic does not totally skip running the LZ compression mechanism but instead may adjust the way the LZ compression mechanism runs on a particular message by modifying configuration parameters in order to produce a beneficial compression.

Upon receipt of a PDU from transmitting server 204, receiving server 214 extracts the message from the PDU payload and determines based on the PDU header whether the message has been compressed by LZ mechanism 208. If the received message has been compressed by LZ mechanism 208, then receiving server 214 decompresses the message by using a corresponding LZ decompression mechanism. Thereafter, receiving server 214 further decompresses the resulting message by processing the data chunks and/or signatures included in the message. For example, receiving server 214 may update its data transmission dictionary cache by storing any non-previously received signatures and their associated data chunks; then, receiving server 214 assembles the original message by replacing each previously received signature (e.g. a signature that receiving server 214 locates in its data transmission dictionary) with its associated data chunk from the data transmission dictionary cache.

4.0 Methods of Balancing Throughput and Compression

4.1 Using Heuristics-Based Compression Metrics

Figure 3A:
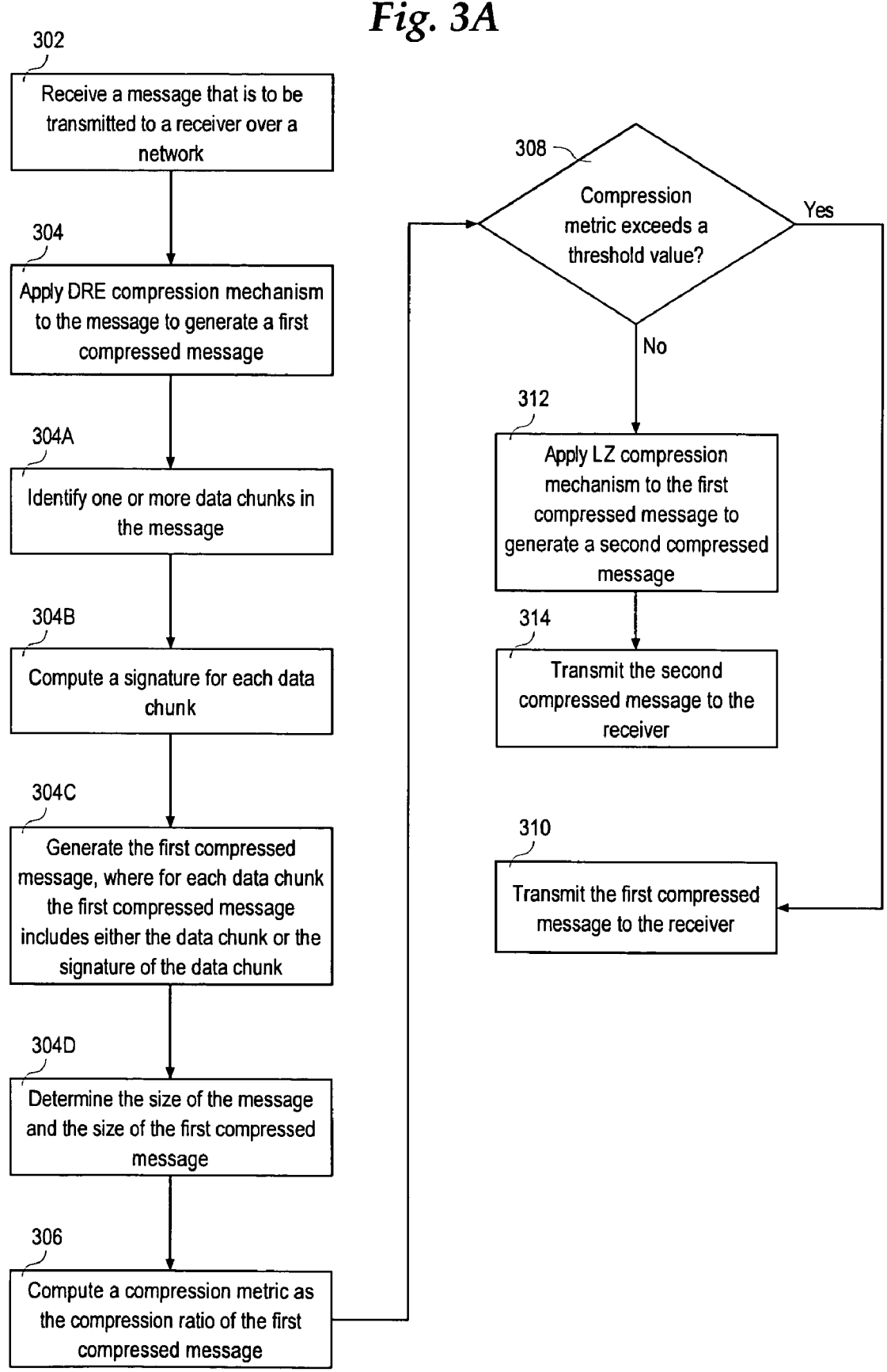
FIG. 3A is a flow diagram that illustrates an overview of one embodiment of a method for balancing throughput and compression in a network communication system.

FIG. 3A is a flow diagram that illustrates an overview of one embodiment of a method for balancing throughput and compression in a network communication system. In this embodiment, the techniques described herein are implemented as one or more software components that execute in a network element that is communicatively connected to a network. The one or more software components utilize two compression mechanisms to compress data that is transmitted to receivers over the network—a DRE compression mechanism followed by a LZ compression mechanism.

A message that is to be transmitted to a receiver over the network is received in step 302. For example, the received message may be an application-specific message that conforms to a particular protocol (e.g. CIFS protocol) that is used to communicate data to the receiver. In another example, the message may be one of a plurality of successive messages into which a stream of receiver-bound data is split.

In step 304, a first compression mechanism is applied to the message to generate a first compressed message. The first compression mechanism is a DRE mechanism that uses a chunking algorithm to split the message into data chunks and to eliminate previously transmitted data chunks by replacing them in the first compressed message with shorter chunk signatures.

As part of generating the first compressed message, in step 304A one or more data chunks are identified in the message. A content-based fingerprint function is used to calculate fingerprint values at each byte of the message over a backward-extending sliding window of fixed size. As the computing of fingerprint values progresses, one or more breakpoint selection criteria are applied to the computed fingerprint values to locate breakpoints that identify the boundaries of the one or more data chunks in which the message is split.

When the one or more data chunks of the message are identified, in step 304B a collision-resistant cryptographic function is used to compute a signature for each data chunk based on all the bytes (i.e. the entire content) of that data chunk. A signature computed for a particular data chunk identifies that particular data chunk to the sender and the receiver of the message; the sender of the message uses the signature to determine whether the particular data chunk has previously been transmitted to the receiver and, if the particular data chunk has previously been transmitted, the receiver of the message uses the signature to locate the particular data chunk in its cache of previously transmitted data chunks.

The first compressed message is generated in step 304C. For each data chunk identified in the original message, the first compressed message includes either the signature of that data chunk (if that data chunk has previously been transmitted to the receiver) or that data chunk itself along with its signature (if that data chunk has not been previously transmitted to the receiver). By replacing previously transmitted data chunks with shorter and randomly computed signatures, the data redundancy of the content of the first compressed message is reduced. Thus, when a lot of data chunks are replaced in the first compression message with their associated signatures, applying any other compression mechanism (such as the LZ compression mechanism) to the first compressed message may not produce a high compression because there will not be a lot of repeating data in left the message.

In order to determine whether to apply the second compression mechanism (the LZ compression mechanism) to the first compressed message, in step 304D compression information associated with the first compressed message is collected. For example, the size of the original message and the size of the first compressed message may be determined. In addition, or instead of, the number of data chunks identified in the original message and the number of data chunks replaced by signatures in the first compressed message may also be determined in this step.

In step 306, a compression metric for the first compressed message is computed based on the collected compression information. The compression metric may be a compression ratio of the first compressed message. For example, the compression ratio may be computed as a percentage based on the size of the original message and the size of the first compressed message (e.g. size of original message minus size of first computed message divided by the size of the original message.) In another example, the compression ratio may be computed as a percentage based on the number of data chunks in the original message and the number of signatures in the first compressed message (e.g. number of signatures in the first compressed message divided by the number of data chunks in the original message.) In some embodiments, the collected compression information may reflect the number of bytes that are replaced in the first compressed message by the first compression algorithm, and the compression metric may be an absolute number that reflects the number of raw (original) bytes that are present in the first compressed message.

In step 308, the computed compression metric is compared to a threshold value to determine whether the second compression mechanism, the LZ compression mechanism, should be applied to the first compressed message. For example, for a compression metric that is the compression ratio of the first compressed message, the threshold value may be set at 0.95. If the computed compression metric exceeds 0.95, then it is very likely that most of the original data was replaced in the first compressed message by signatures and consequently applying the LZ compression mechanism would not produce much higher compression. If the computed compression metric does not exceed 0.95, then the first compressed message likely retains at least some portions of the original data; thus, applying the LZ compression mechanism to the message would likely produce beneficial compression. In some embodiments, instead of making a binary decision of whether to apply or not to apply the second compression mechanism to the first compressed message, in this step a decision may be made to apply the second compression mechanism but with compression parameters that are modified in a certain way. For example, the comparison of the compression metric to the threshold value may be used as the basis of a decision to modify certain compression parameters of the second compression mechanism in order to dynamically configure the mechanism to use less computer system resources (e.g. CPU time and memory) when the mechanism is applied to the first compressed message.

If in step 308 it is determined that the compression metric exceeds the threshold value, then the LZ compression mechanism is not applied to the first compressed message, and in step 310 the first compressed message is transmitted to the receiver over the network. If in step 308 it is determined that the compression metric does not exceed the threshold value, then in step 312 the LZ compression mechanism is applied to the first compressed message to generate a second compressed message. The second compressed message is then transmitted to the receiver over the network in step 314.

Alternatively, based on the decision made in step 308, in some embodiments one or more configuration parameters of the LZ compression mechanism may be modified in step 312 before the compression mechanism is applied to the first compressed message to generate the second compressed message, which is then transmitted to the receiver in step 314.

4.2 Using Entropy-Based Compression Metrics

Figure 3B:
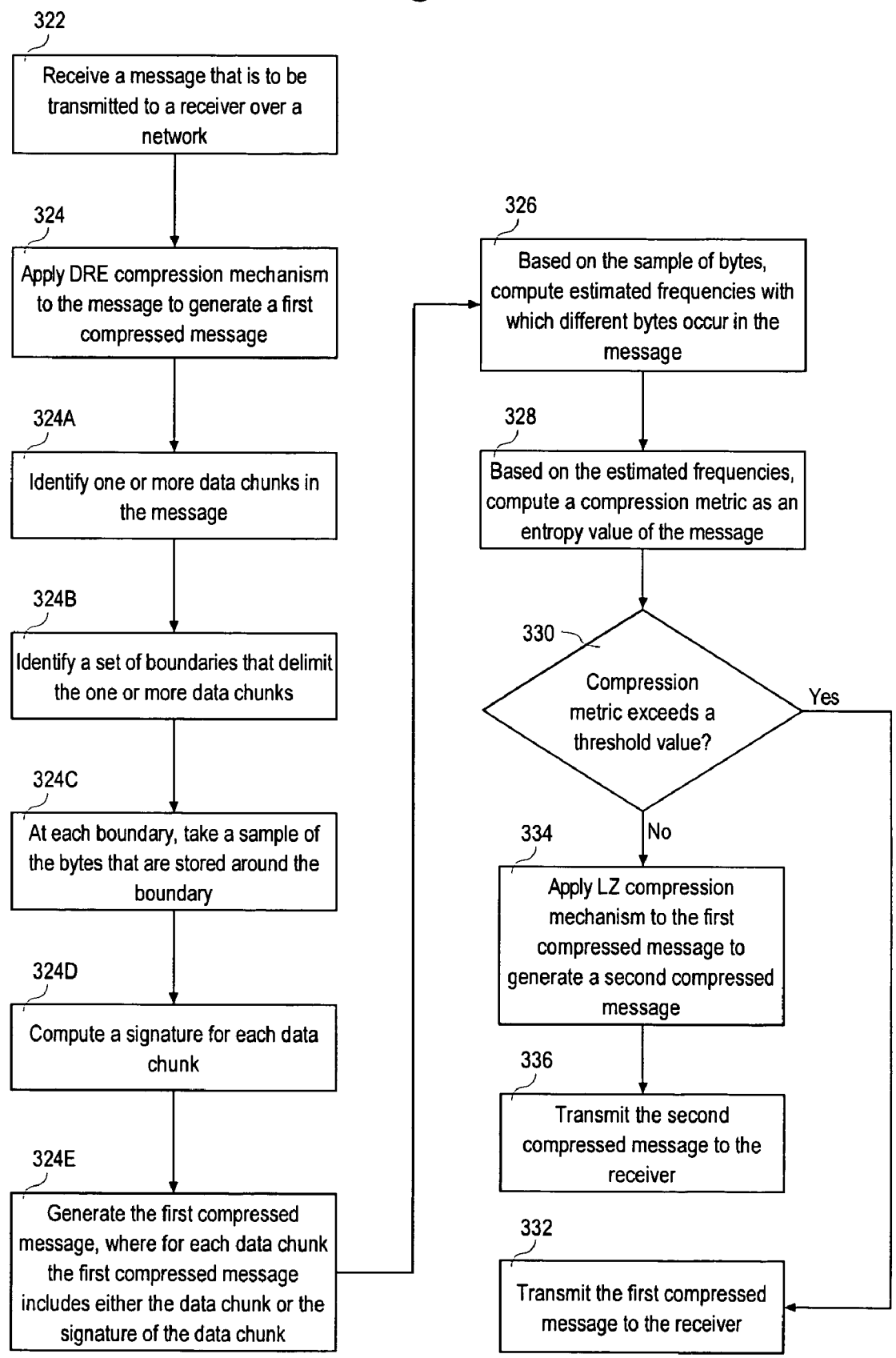
FIG. 3B is a flow diagram that illustrates an overview of another embodiment of a method for balancing throughput and compression in a network communication system.

FIG. 3B is a flow diagram that illustrates an overview of one embodiment of a method for balancing throughput and compression in a network communication system. In this embodiment, the techniques described herein are implemented as one or more software components that execute in a network element that is communicatively connected to a network. The one or more software components utilize two compression mechanisms to compress data that is transmitted to receivers over the network—a DRE compression mechanism followed by a LZ compression mechanism.

A message that is to be transmitted to a receiver over the network is received in step 322. For example, the received message may be an application-specific message that conforms to a particular protocol (e.g. CIFS protocol) that is used to communicate data to the receiver. In another example, the message may be one of a plurality of successive messages into which a stream of receiver-bound data is split.

In step 324, a first compression mechanism is applied to the message to generate a first compressed message. The first compression mechanism is a DRE mechanism that uses a chunking algorithm to split the message into data chunks and to eliminate previously transmitted data chunks by replacing them in the first compressed message with shorter chunk signatures.

As part of generating the first compressed message, in step 324A one or more data chunks are identified in the message. A content-based fingerprint function is used to calculate fingerprint values at each byte of the message over a backward-extending sliding window of fixed size. As the computing of fingerprint values progresses, in step 324B breakpoint selection criteria is applied to the computed fingerprint values to locate breakpoints that identify the boundaries of the one or more data chunks in which the message is split.

As the boundaries of the data chunks are identified, in step 324C compression information is collected around each identified chunk boundary. For example, the collected compression information may be a sample of the bytes stored on either or both sides of the identified boundary. The sample of the bytes may further reflect the identity of each collected byte according to a particular byte-encoding scheme. (In some embodiments, compression information in the form of byte samples may be collected only from data chunks that are not going to be replaced in the first compression message with their associated signatures in order to more accurately reflect the randomness of the original data that remains in the first compressed message after applying the first compression algorithm.)

In step 324D a collision-resistant cryptographic function is used to compute a signature for each data chunk based on all the bytes (i.e. the entire content) of that data chunk. A signature computed for a particular data chunk identifies that particular data chunk to the sender and the receiver of the message; the sender of the message uses the signature to determine whether the particular data chunk has previously been transmitted to the receiver and, if the particular data chunk has previously been transmitted, the receiver of the message uses the signature to locate the particular data chunk in its cache of previously transmitted data chunks.

The first compressed message is generated in step 324E. For each data chunk identified in the original message, the first compressed message includes either the signature of that data chunk (if that data chunk has previously been transmitted to the receiver) or that data chunk itself along with its signature (if that data chunk has not been previously transmitted to the receiver).

After the first compressed message is generated, in step 326 estimated frequencies with which different bytes occur in the first compressed message are computed based on the samples of bytes taken at the data chunk boundaries. In step 328, a compression metric is computed as an entropy value for the message based on the estimated occurrence frequencies.

In general, entropy is a measure that indicates how random is the data included in a particular data unit. For example, in a message of bytes, in which each byte is encoded according to a particular byte-encoding scheme, an entropy calculation formula may be used to calculate how redundant the data in the message is by plugging the occurrence frequency of each byte into the formula. A typical entropy formula produces an entropy value between 0 and 1. An entropy value close to 0 indicates that the message includes frequently occurring (or non-random) bytes. An entropy value close to 1 indicates that the message includes randomly occurring bytes.

The embodiment illustrated in FIG. 3B uses Shannon's Entropy Formula to compute an entropy value for the first compressed message. Since in this embodiment data chunk boundaries are determined based on the content of the original message, the samples of bytes collected around these chunk boundaries reflect data that is collected at random. Thus, in this embodiment the entropy value computed from estimated occurrence frequencies calculated based on the byte samples from chunk boundaries is a very good estimate of the exact entropy value for the message. In this way, the techniques described herein use already random chunk boundaries as the basis for collecting byte samples that are used to compute an entropy value for the message. Shannon's Entropy Formula, used in this embodiment to calculate the entropy value H for the first compressed message, is as follows:

$$H = \frac{1}{8} \sum_{i=1}^{n} p(i) \log_2 \left( \frac{1}{p(i)} \right)$$

where n is the "alphabet size" or the number of all possible bytes (e.g. 256), p(i) is the occurrence frequency of the $i^{th}$ byte in the message, and each byte is represented by 8 bits (i.e. each byte may assume any of $2^8=256$ discrete states).

In other embodiments, instead of basing the entropy value of the first compressed message on estimated occurrence frequencies calculated from byte samples, the first compressed message may be scanned to determine the exact frequencies with which the different bytes occur in the message, and the entropy value for the message may be calculated from Shannon's Entropy Formula based on these exact occurrence frequencies.

In step 330, the computed entropy value is compared to a threshold value to determine whether the second compression mechanism, the LZ compression mechanism, should be applied to the first compressed message. For example, the threshold value may be set at 0.90. If the computed entropy value of the first compressed message exceeds 0.90, then the data in the first compressed message is highly random and applying the LZ compression mechanism is not likely to produce much higher compression. If the computed entropy value does not exceed 0.90, then the data in the first compressed message is not random and is likely repeating; thus, applying the LZ compression mechanism to the message would likely produce beneficial compression. In some embodiments, the threshold value may not be fixed but may depend on the number of sampled bytes (e.g. on the sample size) since larger samples may need a higher threshold value. These embodiments may use a table of sample size intervals with corresponding threshold values (e.g. the entries in the table may correlate five different sample size intervals with the five threshold values of 0.91, 0.93, 0.95, 0.97, and 0.99). Further, in some embodiments instead of making a binary decision of whether to apply or not to apply the second compression mechanism to the first compressed message, in this step a decision may be made to apply the second compression mechanism but with compression parameters that are modified in a certain way. For example, the comparison of the entropy value to the threshold value may be used as the basis of a decision to modify certain compression parameters of the second compression mechanism in order to dynamically configure the mechanism to use less computer system resources (e.g. CPU time and memory) when the mechanism is applied to the first compressed message.

If in step 330 it is determined that the entropy value exceeds the threshold value, then the LZ compression mechanism is not applied to the first compressed message, and in step 332 the first compressed message is transmitted to the receiver over the network. If in step 330 it is determined that the entropy value does not exceed the threshold value, then in step 334 the LZ compression mechanism is applied to the first compressed message to generate a second compressed message. The second compressed message is then transmitted to the receiver over the network in step 336.

Alternatively, based on the decision made in step 330, in some embodiments one or more configuration parameters of the LZ compression mechanism may be modified in step 334 before the compression mechanism is applied to the first compressed message to generate the second compressed message, which is then transmitted to the receiver in step 336.

4.3 Using Multiple Compression Metrics

In some embodiments, the techniques described herein for balancing throughput and compression may use multiple compression metrics do determine whether to apply a second, or any subsequent, compression mechanism to an already compressed message. Further, in different embodiments the multiple compression metrics may include both heuristics-based compression metrics and entropy-based compression metrics.

In one example embodiment, the techniques described herein may be implemented as one or more software components that execute in a network element that is communicatively connected to a network. The one or more software components may utilize two compression mechanisms to compress data that is transmitted to receivers over the network (a DRE compression mechanism followed by a LZ compression mechanism) and may use both a heuristics-based compression metric and an entropy-based compression metric.

In this embodiment, a message that is to be transmitted to a receiver over the network is received. A first compression mechanism is then applied to the message to generate a first compressed message. The first compression mechanism is a DRE mechanism that uses a chunking algorithm to split the message into data chunks and to eliminate previously transmitted data chunks by replacing them in the first compressed message with shorter chunk signatures.

As part of generating the first compressed message, a content-based fingerprint function is used to calculate fingerprint values at each byte of the message over a backward-extending sliding window of fixed size. As the computing of fingerprint values progresses, one or more breakpoint selection criteria are applied to the computed fingerprint values to locate breakpoints that identify the boundaries of the one or more data chunks in which the message is split.

As the boundary of a particular data chunk is selected and the data chunk is identified, a collision-resistant cryptographic function is used to compute a signature for the data chunk based on all the bytes (i.e. the entire content) of that data chunk. After the signature of the data chunk is computed, a determination is made based on the signature of whether the data chunk has previously been transmitted to the receiver. For example, the signature may be used to perform a lookup in a data transmission dictionary cache that stores the signatures of all data chunks that have previously been transmitted to the receiver.

If a determination is made that the particular data chunk has not been previously transmitted to the receiver, then that data chunk is going to be included in the first compressed message. For this reason, a sample of bytes is taken from the beginning and/or from the end of the data chunk. The sample of bytes reflects the identity of each collected byte according to a particular byte-encoding scheme, and is subsequently used to calculate estimated occurrence frequencies of the bytes that are included in the first compressed message. If, based on the signature of the particular data chunk, a determination is made that the data chunk has previously been transmitted to the receiver, then a sample of bytes is not collected at the boundaries of the data chunk since the data chunk is going to be replaced by its signature in the first compressed message. Thereafter, the first compression mechanism proceeds with identifying the boundary of the next data chunk in the received message and processing the next data chunk in the same manner.

In addition to collecting samples of bytes from data chunks that are going to be included in the first compressed message, in this embodiment heuristics-based compression information is also collected. For example, the size of the original message and the size of the first compressed message may be determined. Instead of, or in addition, the number of data chunks identified in the received original message and the number of data chunks replaced by signatures in the first compressed message may also be determined during the process of generating the first compressed message.

After all data chunks in the received message are identified and processed in the above manner, the first compressed message is generated. For each data chunk identified in the original message, the first compressed message includes either the signature of that data chunk (if that data chunk has previously been transmitted to the receiver) or that data chunk itself along with its signature (if that data chunk has not been previously transmitted to the receiver).

A first compression metric for the first compressed message is computed based on the collected heuristic-based compression information. The first compression metric may be a compression ratio of the first compressed message that is computed based on the size of the original message and the size of the first compressed message and/or based on the number of data chunks in the original message and the number of signatures in the first compressed message. The first compression metric is compared to a first threshold value (for example, to 0.80) to determine whether the second compression mechanism, the LZ compression mechanism, should be applied to the first compressed message. If the first compression metric exceeds the first threshold value, then the LZ compression mechanism is not applied to the first compressed message, and the first compressed message is transmitted to the receiver over the network without any further compression.

If the first compression metric does not exceed the first threshold value, then a second compression metric is computed and compared to a second threshold value to determine whether the LZ compression mechanism should be applied to the first compressed message before it is transmitted to the receiver over the network. The second compression metric is an entropy value for the first compressed message and is computed based on the samples of bytes that were collected at the boundaries of the data chunks that are not replaced by their associated signatures in the first compressed message. Specifically, based on the samples of bytes, estimated frequencies with which different bytes occur in the first compressed message are computed. The estimated occurrence frequencies are then plugged in an entropy calculation formula to compute the entropy value for the first compressed message.

The computed entropy value is then compared to the second threshold value (for example, to 0.70) to determine whether the LZ compression mechanism should be applied to the first compressed message. If the computed entropy value exceeds the second threshold value, then the LZ compression mechanism is not applied to the first compressed message, and the first compressed message is transmitted to the receiver over the network without further compression. If the computed entropy value does not exceed the second threshold value, then the LZ compression mechanism is applied to the first compressed message to generate a second compressed message. The second compressed message is then transmitted to the receiver over the network.

In this way, the techniques described herein provide for computationally efficient way of determining whether a second, or any subsequent, compression mechanism should be applied to an already compressed message. Further, depending on the particular compression and throughput requirements of the different embodiments, various combinations of heuristics-based and/or entropy-based compression metrics may be used to determine whether one or more additional compression mechanisms should be applied to an already compressed message before the message is sent to its intended recipient. Thus, the techniques described herein are not limited to any particular embodiment, and for this reason the embodiments described herein are to be regarded in an illustrative rather than a restrictive sense.

4.4 Additional Features and Alternative Embodiments

The techniques described herein for balancing throughput and compression may be applied in a variety of operational contexts where data is compressed by multiple compression mechanisms.

For example, one embodiment of the techniques described herein may be implemented in a file system that uses multiple compression mechanisms to compress files before storing them. In this embodiment, a file to be compressed may be split in several portions, and each portion may be passed through a sequence of file system components that perform data compression. According to the techniques described herein, compression information is collected while each portion of the file is compressed by a first compression mechanism. Based on the collected compression information, a compression metric is then computed for the portion being processed. The compression metric is then compared to a pre-determined threshold value. The portion of the file being processed is then send to a second component of the file system for compression by a second compression mechanism only when the computed compression metric does not exceed the threshold value.

According to the techniques described herein, some embodiments may use additional techniques to periodically check whether the decisions of whether or not to run the second compression mechanism on a number of successive messages is correct. If a determination is made that for a particular message the second compression mechanism was (or was not) applied when it should not have been applied (or should have been applied), then an appropriate corrective action may be undertaken to ensure that the decisions of whether to apply the second compression mechanism would result in resource efficient and beneficial message compression. For example, the appropriate corrective action may include modifying the threshold value, modifying the way the compression metric is computed, and/or modifying the manner in which the compression information is collected. In another example, in embodiments that provide for collecting compression information from an aggregation of messages that belong to a particular user session and/or protocol, the appropriate corrective action may include modifying threshold values associated with the particular user session and/or protocol, thus affecting decisions made to subsequent messages belonging to the same session and/or protocol. Further, in different embodiments the appropriate corrective actions may be performed by a network engineer or automatically by the computer system on which the techniques are implemented.

For example, in one embodiment a sender in a network communication system may utilize two compression mechanisms to compress a stream of successive messages that are transmitted over a network to a receiver. The first compression mechanism is a DRE compression mechanism and the second compression mechanism is a LZ compression mechanism. In this embodiment, the sender may periodically check whether the decisions not to apply the LZ compression mechanism to particular messages are correct. The sender may perform the check for decision correctness, for example, every K seconds, on every $N^{th}$ message, and/or after every M number of transmitted bytes (where K, N, and M may be any pre-determined numbers). To check whether a decision not to apply the LZ compression mechanism to a compressed message is correct, the sender applies the LZ compression mechanism to the compressed message anyway. If the LZ compression mechanism does not produce good additional compression, then the decision not to apply the LZ compression mechanism to this compressed message was correct in the first place. Further, this would be a good indication that decisions not to apply the LZ compression mechanisms to other messages are also correct, and for this reason the sender does not need to take any corrective actions. If, however, the LZ compression mechanism produces a good additional compression when applied to a compressed message for which a decision not to apply the LZ compression mechanism has been made, then this would be an indication that the LZ compression mechanism is not being applied to messages to which it should have been applied. In this case, the sender may take a number of corrective actions to ensure that the LZ compression mechanism is applied to produce beneficial compression. Such corrective actions may include modifying the threshold value based on which the decision not to run the LZ compression mechanism is made, and/or modifying the periodicity with which the necessary compression information is collected in order to provide for more accurate compression metrics.

5.0 Implementation Mechanisms—Hardware Overview

Figure 4:
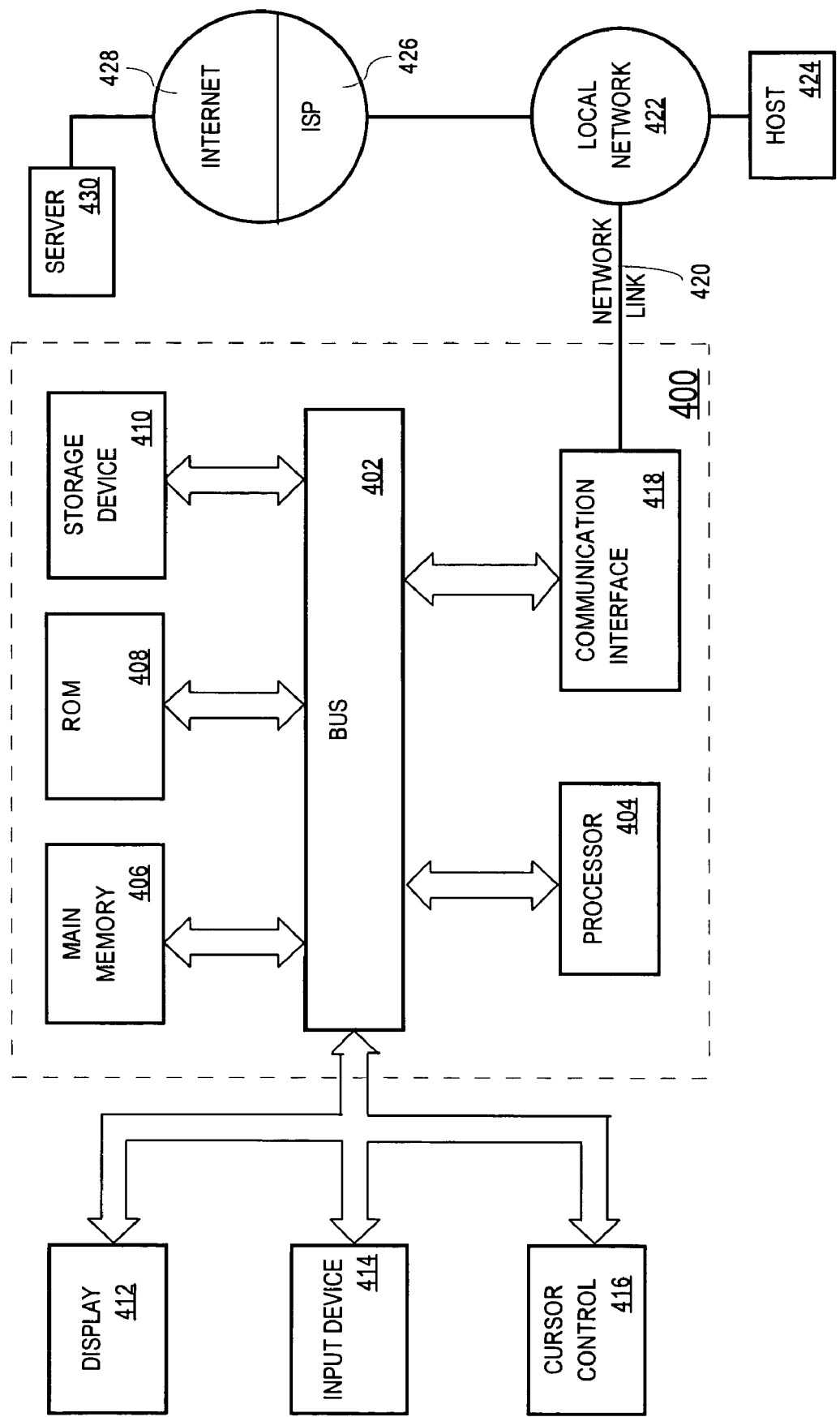
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, computer system 400 is a router.

Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for balancing throughput and compression in a network communication system. According to one embodiment of the invention, balancing throughput and compression in a network communication system is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for balancing throughput and compression in a network communication system as described herein.

The received code may be executed by processor 404 as it is received, and/or stored in storage device 410, or other non-volatile storage for later execution. In this manner, computer system 400 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus, comprising:
one or more processors; and
one or more stored instructions which, when executed by the one or more processors, cause:
for each message of a plurality of successive messages, performing steps comprising:
receiving the message of the plurality of successive messages;
applying a first compression mechanism to the message to generate a first compressed message, wherein applying the first compression mechanism comprises gathering compression information;
based on the compression information, computing a compression metric that is associated with the first compressed message;
comparing the compression metric to a threshold value;
applying a second compression mechanism to the first compressed message to generate a second compressed message only when the compression metric does not exceed the threshold value;
not applying the second compression mechanism to the first compressed message when the compression metric exceeds the threshold value;
wherein, for at least two different messages of the plurality of successive messages, different decisions are made of whether to apply the second compression mechanism; and
periodically performing steps comprising:
determining whether a decision not to apply the second compression mechanism to a particular message of the plurality of successive messages is correct; and
modifying the threshold value when the decision is not correct.

2. The apparatus of claim 1, wherein the instructions further comprise instructions which, when executed by the one or more processors, cause transmitting the second compressed message in a protocol data unit to a receiver over a network, wherein the protocol data unit comprises a payload that stores the second compressed message and a header that stores data which indicates that the second compressed message is generated by applying the second compression mechanism.

3. The apparatus of claim 1, wherein:
the message is a portion of a file that is to be compressed and stored as a compressed file in a file system; and
the instructions further comprise instructions which, when executed by the one or more processors, cause storing the second compressed message in the compressed file.

4. The apparatus of claim 1, wherein the instructions further comprise instructions which, when executed by the one or more processors, cause:
selectively differently applying the second compression mechanism for said at least two different messages of the plurality of successive messages by applying the second compression mechanism to one message of said at least two different messages and not applying the second compression mechanism to another message of said at least two different messages.

5. The apparatus of claim 1, wherein:
the first compression mechanism is a data redundancy elimination mechanism that breaks the message into one or more data chunks and replaces, in the first compressed message, at least one data chunk of the one or more data chunks with a digital signature that is computed for that data chunk; and
the second compression mechanism is a Lempel-Ziv (LZ) compression mechanism.

6. The apparatus of claim 1, wherein:
the compression information includes the size of the message and the size of the first compressed message; and
the compression metric is a compression ratio of the first compressed message that is computed based on the size of the message and the size of the first compressed message.

7. The apparatus of claim 1, wherein:
the compression information includes frequencies with which a plurality of different bytes occur in the message; and
the compression metric is an entropy value that is computed based on the frequencies, wherein the entropy value indicates a measure of randomness of the data included in the first compressed message.

8. An apparatus for balancing throughput and compression in a network communication system, comprising:
- a network interface that is coupled to a network for sending one or more packet flows thereto;
- one or more processors; and
- one or more stored instructions which, when executed by the one or more processors, cause:
  - for each message of a plurality of successive messages that are to be transmitted to a receiver over the network, performing steps comprising:
    - receiving the message of the plurality of successive messages;
    - applying a first compression mechanism to the message to generate a first compressed message by identifying one or more data chunks in the message; computing a signature for each of the one or more data chunks; generating the first compressed message, wherein, for each of the one or more data chunks, the first compressed message includes one of that data chunk and the signature associated with that data chunk; and gathering compression information associated with at least one of the message and the first compressed message;
    - based on the compression information, computing a compression metric that is associated with the first compressed message;
    - comparing the compression metric to a threshold value in order to decide whether to apply a second compression mechanism to the first compressed message;
    - applying the second compression mechanism to the first compressed message to generate a second compressed message only when the compression metric does not exceed the threshold value;
    - not applying the second compression mechanism to the first compressed message when the compression metric exceeds the threshold value; and
    - transmitting one of the first compressed message and the second compressed message to the receiver;
  - wherein, for at least two different messages of the plurality of successive messages, different decisions are made of whether to apply the second compression mechanism; and
  - periodically performing the steps of:
    - determining whether a decision not to apply the second compression mechanism to a particular message of the plurality of successive messages is correct; and
    - modifying the threshold value when the decision is not correct.

9. The apparatus of claim 8, wherein the second compression mechanism is a Lempel-Ziv (LZ) compression mechanism.

10. The apparatus of claim 8, wherein:
the compression information includes the size of the message and the size of the first compressed message; and
the compression metric is a compression ratio of the first compressed message that is computed based on the size of the message and the size of the first compressed message.

11. The apparatus of claim 8, wherein:
the compression information includes the number of the one or more data chunks identified in the message and the number of the signatures included in the first compressed message; and
the compression metric is a compression ratio of the first compressed message that is computed based on the number of the one or more data chunks identified in the message and the number of the signatures included in the first compressed message.

12. The apparatus of claim 8, further comprising instructions which, when executed by the one or more processors, cause:
for each message of the plurality of successive messages performing steps comprising:
  identifying a set of boundaries that delimit the one or more data chunks in the message;
  at each boundary of the set of boundaries, taking a sample of bytes that are stored on at least one side of that boundary;
  based on the gathered samples of bytes, computing estimated frequencies with which a plurality of different bytes occur in the first compressed message; and
  based on the estimated frequencies, computing the compression metric as an entropy value, wherein the entropy value indicates a measure of randomness of the data included in the first compressed message.

13. The apparatus of claim 8, wherein the compression metric is a first compression metric and the threshold value is a first threshold value, and wherein:
the instructions that cause gathering the compression information further comprise instructions which, when executed by the one or more processors, cause:
  taking a sample of bytes from each data chunk in the message that would be included in the first compressed message and that would not be replaced by a corresponding signature in the first compressed message; and
  determining the size of the message and the size of the first compressed message;
the instructions that cause computing the compression metric further comprise instructions which, when executed by the one or more processors, cause:
  computing the first compression metric as a compression ratio of the first compressed message based on the size of the message and the size of the first compressed message;
  based on the gathered samples of bytes, computing estimated frequencies with which a plurality of different bytes occur in the first compressed message; and
  based on the estimated frequencies, computing a second compression metric as an entropy value, wherein the entropy value indicates a measure of randomness of the data included in the first compressed message;
the instructions that cause comparing the compression metric to the threshold value further comprise instructions which, when executed by the one or more processors, cause:
  comparing the first compression metric to the first threshold value; and
  comparing the second compression metric to the second threshold value; and
the instructions that cause applying the second compression mechanism further comprise instructions which, when executed by the one or more processors, cause applying the second compression mechanism only when the first compression metric does not exceed the first threshold value and the second compression metric does not exceed the second threshold value.

14. The apparatus of claim 8, wherein:
the instructions further comprise instructions which, when executed by the one or more processors, cause maintaining a data transmission dictionary, wherein the data transmission dictionary includes signatures of previously transmitted data chunks; and the instructions that cause generating the first compressed message further comprise instructions which, when executed by the one or more processors, cause:

including a particular data chunk in the first compressed message when a particular signature computed for the particular data chunk of the one or more data chunks is not located in the data transmission dictionary; and including, in the first compressed message, the particular signature but not the particular data chunk when the particular signature computed for the particular data chunk is located in the data transmission dictionary.

15. An apparatus, comprising:

means for processing each message of a plurality of successive messages, wherein the means for processing the message comprise:

means for receiving the message of the plurality of successive messages;

means for applying a first compression mechanism to the message to generate a first compressed message, wherein the means for applying the first compression mechanism comprise means for gathering compression information;

means for computing a compression metric that is associated with the first compressed message based on the compression information;

means for comparing the compression metric to a threshold value;

means for applying a second compression mechanism to the first compressed message to generate a second compressed message only when the compression metric does not exceed the threshold value;

means for not applying the second compression mechanism to the first compressed message when the compression metric exceeds the threshold value;

wherein, for at least two different messages of the plurality of successive messages, different decisions are made of whether to apply the second compression mechanism;

means for periodically determining whether a decision not to apply the second compression mechanism to a particular message of the plurality of successive messages is correct; and means for modifying the threshold value when the decision is not correct.

16. The apparatus of claim 15, further comprising means for transmitting the second compressed message in a protocol data unit to a receiver over a network, wherein the protocol data unit comprises a payload that stores the second compressed message and a header that stores data which indicates that the second compressed message is generated by applying the second compression mechanism.

17. The apparatus of claim 15, wherein:

the message is a portion of a file that is to be compressed and stored as a compressed file in a file system; and the apparatus further comprises means for storing the second compressed message in the compressed file.

18. The apparatus of claim 15, wherein the means for processing the message comprise further comprise:

means for selectively differently applying the second compression mechanism for said at least two different messages of the plurality of successive messages by applying the second compression mechanism to one message of said at least two different messages and not applying the second compression mechanism to another message of said at least two different messages.

19. The apparatus of claim 15, wherein:

the first compression mechanism is a data redundancy elimination mechanism that breaks the message into one or more data chunks and replaces, in the first compressed message, at least one data chunk of the one or more data chunks with a digital signature that is computed for that data chunk; and the second compression mechanism is a Lempel-Ziv (LZ) compression mechanism.

20. The apparatus of claim 15, wherein:

the compression information includes the size of the message and the size of the first compressed message; and the compression metric is a compression ratio of the first compressed message that is computed based on the size of the message and the size of the first compressed message.

21. The apparatus of claim 15, wherein:

the compression information includes frequencies with which a plurality of different bytes occur in the message; and the compression metric is an entropy value that is computed based on the frequencies, wherein the entropy value indicates a measure of randomness of the data included in the first compressed message.

22. An apparatus for balancing throughput and compression in a network communication system, comprising:

means for processing each message of a plurality of successive messages that are to be transmitted to a receiver over the network, wherein the means for processing the message comprise:

means for receiving the message of the plurality of successive messages;

means for applying a first compression mechanism to the message to generate a first compressed message, comprising:

means for identifying one or more data chunks in the message;

means for computing a signature for each of the one or more data chunks;

means for generating the first compressed message, wherein, for each of the one or more data chunks, the first compressed message includes one of that data chunk and the signature associated with that data chunk; and means for gathering compression information associated with at least one of the message and the first compressed message;

means for computing, based on the compression information, a compression metric that is associated with the first compressed message;

means for comparing the compression metric to a threshold value in order to decide whether to apply a second compression mechanism to the first compressed message;

means for applying the second compression mechanism to the first compressed message to generate a second compressed message only when the compression metric does not exceed the threshold value;

means for not applying the second compression mechanism to the first compressed message when the compression metric exceeds the threshold value; and means for transmitting one of the first compressed message and the second compressed message to the receiver;

wherein, for at least two different messages of the plurality of successive messages, different decisions are made of whether to apply the second compression mechanism;

means for periodically determining whether a decision not to apply the second compression mechanism to a particular message of the plurality of successive messages is correct; and means for modifying the threshold value when the decision is not correct.

23. The apparatus of claim 22, wherein the second compression mechanism is a Lempel-Ziv (LZ) compression mechanism.

24. The apparatus of claim 22, wherein:

the compression information includes the size of the message and the size of the first compressed message; and the compression metric is a compression ratio of the first compressed message that is computed based on the size of the message and the size of the first compressed message.

25. The apparatus of claim 22, wherein:

the compression information includes the number of the one or more data chunks identified in the message and the number of the signatures included in the first compressed message; and the compression metric is a compression ratio of the first compressed message that is computed based on the number of the one or more data chunks identified in the message and the number of the signatures included in the first compressed message.

26. The apparatus of claim 22, wherein the means for processing the message further comprise:

means for identifying a set of boundaries that delimit the one or more data chunks in the message;

means for taking, at each boundary of the set of boundaries, a sample of bytes that are stored on at least one side of that boundary;

means for computing, based on the gathered samples of bytes, estimated frequencies with which a plurality of different bytes occur in the first compressed message; and means for computing, based on the estimated frequencies, the compression metric as an entropy value, wherein the entropy value indicates a measure of randomness of the data included in the first compressed message.

27. The apparatus of claim 22, wherein the compression metric is a first compression metric and the threshold value is a first threshold value, and wherein the means for processing the message further comprise:

means for taking a sample of bytes from each data chunk in the message that would be included in the first compressed message and that would not be replaced by a corresponding signature in the first compressed message;

means for determining the size of the message and the size of the first compressed message;

means for computing the first compression metric as a compression ratio of the first compressed message based on the size of the message and the size of the first compressed message;

means for computing, based on the gathered samples of bytes, estimated frequencies with which a plurality of different bytes occur in the first compressed message;

means for computing, based on the estimated frequencies, a second compression metric as an entropy value, wherein the entropy value indicates a measure of randomness of the data included in the first compressed message;

means for comparing the first compression metric to the first threshold value;

means for comparing the second compression metric to the second threshold value; and means for applying the second compression mechanism only when the first compression metric does not exceed the first threshold value and the second compression metric does not exceed the second threshold value.

28. The apparatus of claim 22, further comprising:

means for maintaining a data transmission dictionary, wherein the data transmission dictionary includes signatures of previously transmitted data chunks;

wherein the means for processing the message further comprise:

means for including a particular data chunk in the first compressed message when a particular signature computed for the particular data chunk of the one or more data chunks is not located in the data transmission dictionary; and means for including, in the first compressed message, the particular signature but not the particular data chunk when the particular signature computed for the particular data chunk is located in the data transmission dictionary.

29. A method for balancing throughput and compression in a network communication system, comprising:

for each message of a plurality of successive messages that are to be transmitted to a receiver over the network, performing steps comprising:

receiving the message of the plurality of successive messages;

applying first compression mechanism to the message to generate a first compressed message by identifying one or more data chunks in the message; computing a signature for each of the one or more data chunks; generating the first compressed message, wherein, for each of the one or more data chunks, the first compressed message includes one of that data chunk and the signature associated with that data chunk; and gathering compression information associated with at least one of the message and the first compressed message;

based on the compression information, computing a compression metric that is associated with the first compressed message;

comparing the compression metric to a threshold value in order to decide whether to apply second compression mechanism to the first compressed message;

applying the second compression mechanism to the first compressed message to generate a second compressed message only when the compression metric does not exceed the threshold value;

not applying the second compression mechanism to the first compressed message when the compression metric exceeds the threshold value; and transmitting one of the first compressed message and the second compressed message to the receiver;

wherein, for at least two different messages of the plurality of successive messages, different decisions are made of whether to apply the second compression mechanism; and periodically performing the steps of:

determining whether a decision not to apply the second compression mechanism to a particular message of the plurality of successive messages is correct; and modifying the threshold value when the decision is not correct;

wherein the method is performed by one or more network elements.

30. A non-transitory computer-readable volatile or non-volatile medium storing one or more sequences of instructions which, when executed by one or more processors, cause the one or more processors to perform steps comprising:

for each message of a plurality of successive messages, performing steps comprising:
receiving the message of the plurality of successive messages;
applying a first compression mechanism to the message to generate a first compressed message, wherein applying the first compression mechanism comprises gathering compression information;
based on the compression information, computing a compression metric that is associated with the first compressed message;
comparing the compression metric to a threshold value;
applying a second compression mechanism to the first compressed message to generate a second compressed message only when the compression metric does not exceed the threshold value;
not applying the second compression mechanism to the first compressed message when the compression metric exceeds the threshold value;
wherein, for at least two different messages of the plurality of successive messages, different decisions are made of whether to apply the second compression mechanism; and
periodically performing steps comprising:
determining whether a decision not to apply the second compression mechanism to a particular message of the plurality of successive messages is correct; and
modifying the threshold value when the decision is not correct.

31. The computer-readable volatile or non-volatile medium of claim 30, wherein the one or more sequences of instructions further comprise instructions which, when executed by the one or more processors, cause transmitting the second compressed message in a protocol data unit to a receiver over a network, wherein the protocol data unit comprises a payload that stores the second compressed message and a header that stores data which indicates that the second compressed message is generated by applying the second compression mechanism.

32. The computer-readable volatile or non-volatile medium of claim 30, wherein:
the message is a portion of a file that is to be compressed and stored as a compressed file in a file system; and
the one or more sequences of instructions further comprise instructions which, when executed by the one or more processors, cause storing the second compressed message in the compressed file.

33. The computer-readable volatile or non-volatile medium of claim 30, wherein:
the compression information includes the size of the message and the size of the first compressed message; and
the compression metric is a compression ratio of the first compressed message that is computed based on the size of the message and the size of the first compressed message.

34. The computer-readable volatile or non-volatile medium of claim 30, wherein:
the compression information includes frequencies with which a plurality of different bytes occur in the message; and
the compression metric is an entropy value that is computed based on the frequencies, wherein the entropy value indicates a measure of randomness of the data included in the first compressed message.

35. A non-transitory computer-readable volatile or non-volatile medium storing one or more sequences of instructions which, when executed by one or more processors, cause the one or more processors to perform steps comprising:

for each message of a plurality of successive messages that are to be transmitted to a receiver over a network, performing steps comprising:
receiving the message of the plurality of successive messages;
applying a first compression mechanism to the message to generate a first compressed message by identifying one or more data chunks in the message; computing a signature for each of the one or more data chunks; generating the first compressed message, wherein, for each of the one or more data chunks, the first compressed message includes one of that data chunk and the signature associated with that data chunk; and gathering compression information associated with at least one of the message and the first compressed message;
based on the compression information, computing a compression metric that is associated with the first compressed message;
comparing the compression metric to a threshold value in order to decide whether to apply a second compression mechanism to the first compressed message;
applying the second compression mechanism to the first compressed message to generate a second compressed message only when the compression metric does not exceed the threshold value;
not applying the second compression mechanism to the first compressed message when the compression metric exceeds the threshold value; and
transmitting one of the first compressed message and the second compressed message to the receiver;
wherein, for at least two different messages of the plurality of successive messages, different decisions are made of whether to apply the second compression mechanism; and
periodically performing the steps of:
determining whether a decision not to apply the second compression mechanism to a particular message of the plurality of successive messages is correct; and
modifying the threshold value when the decision is not correct.

36. The computer-readable volatile or non-volatile medium of claim 35, wherein:
the compression information includes the size of the message and the size of the first compressed message; and
the compression metric is a compression ratio of the first compressed message that is computed based on the size of the message and the size of the first compressed message.

37. The computer-readable volatile or non-volatile medium of claim 35, wherein:
the compression information includes the number of the one or more data chunks identified in the message and the number of the signatures included in the first compressed message; and
the compression metric is a compression ratio of the first compressed message that is computed based on the number of the one or more data chunks identified in the message and the number of the signatures included in the first compressed message.

38. The computer-readable volatile or non-volatile medium of claim 35, wherein the one or more sequences of instructions further comprise instructions which, when executed by the one or more processors, cause:
for each message of the plurality of successive messages, performing steps comprising:
identifying a set of boundaries that delimit the one or more data chunks in the message;
at each boundary of the set of boundaries, taking a sample of bytes that are stored on at least one side of that boundary;
based on the gathered samples of bytes, computing estimated frequencies with which a plurality of different bytes occur in the first compressed message; and
based on the estimated frequencies, computing the compression metric as an entropy value, wherein the entropy value indicates a measure of randomness of the data included in the first compressed message.

39. The computer-readable volatile or non-volatile medium of claim 35, wherein:
the one or more sequences of instructions further comprise instructions which, when executed by the one or more processors, cause maintaining a data transmission dictionary, wherein the data transmission dictionary includes signatures of previously transmitted data chunks; and
the instructions that cause generating the first compressed message further comprise instructions which, when executed by the one or more processors, cause:
including a particular data chunk in the first compressed message when a particular signature computed for the particular data chunk of the one or more data chunks is not located in the data transmission dictionary; and
including, in the first compressed message, the particular signature but not the particular data chunk when the particular signature computed for the particular data chunk is located in the data transmission dictionary.

* * * * *